C. HAMMESFAHR.
TOOTH BRUSH HOLDER.
APPLICATION FILED DEC. 29, 1914.

1,206,321.

Patented Nov. 28, 1916.

Witnesses:

Inventor
Charles Hammesfahr

By his Attorneys

UNITED STATES PATENT OFFICE.

CHARLES HAMMESFAHR, OF NEW YORK, N. Y.

TOOTH-BRUSH HOLDER.

1,206,321.   Specification of Letters Patent.   Patented Nov. 28, 1916.

Application filed December 29, 1914. Serial No. 879,510.

*To all whom it may concern:*

Be it known that I, CHARLES HAMMESFAHR, a citizen of the United States, and a resident of New York, county of Bronx, and State of New York, have invented certain new and useful Improvements in Tooth-Brush Holders, of which the following is a full, clear, and exact description.

This invention relates more particularly to a device which is adapted to hold tooth brushes and a glass, tumbler or other object.

One of the principal objects of the invention is to provide a simple and efficient sanitary device which is adapted to hold one or more tooth brushes in convenient position for use.

Another object of the invention is to provide a simple and efficient device which is inexpensive to manufacture and which is adapted to be secured to a wall or to any other suitable support.

A further object of the invention is to provide a simple and efficient device, the supporting part of which may be made of glass or other material and detachable in order that the same may be readily cleaned.

A still further object of the invention is to provide a simple and efficient device which is adapted not only to hold and support one or more tooth brushes, but which is adapted also to hold a glass or other receptacle.

With these and other objects in view, the invention will be hereinafter more particularly described with reference to the accompanying drawings, which form a part of this specification, and will then be pointed out in the claims at the end of the description.

Figure 1:
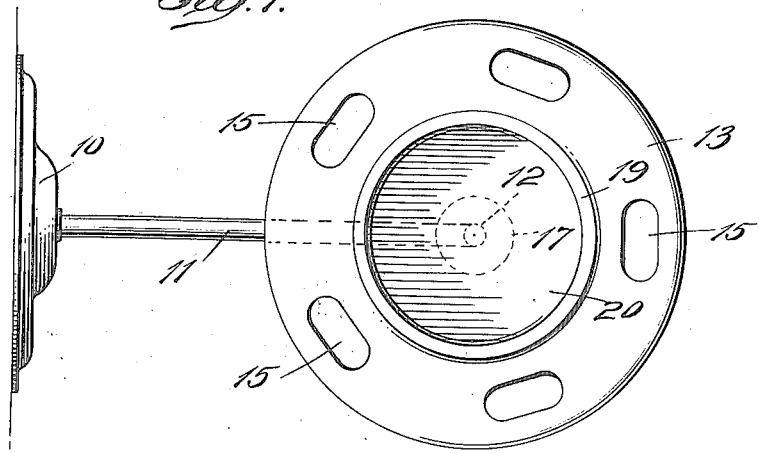
Figure 2:
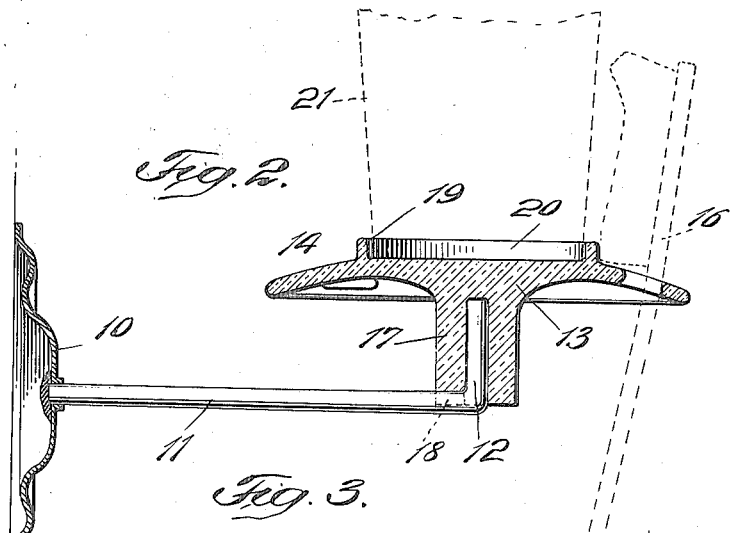
Figure 3:
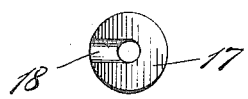
Figure 4:
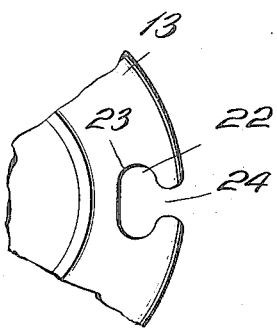

In the drawings, Figure 1 is a plan view of one form of device embodying my invention. Fig. 2 is a vertical section, partly in elevation, of the device, showing in dotted lines how the same may support a tooth brush and also a glass. Fig. 3 is an inverted plan of the boss of the holder member showing how the same may be held against rotation on the supporting rod member; and Fig. 4 is a fragmentary plan showing another form of opening for holding the tooth brush handle.

The device has a base 10 which may be of metal and which is adapted to be secured against a wall by screws or otherwise. A supporting rod or member 11 has one end secured to the base 10 by solder or otherwise substantially centrally thereof and at the outer end, as at 12, extends upward so as to provide a substantially L-shaped bracket member. A holder member 13 of glass, porcelain or similar material, has a body 14. This body may be curved or flat and may have one or more openings 15 through which the handle of a tooth brush or other object to be supported may be inserted, as shown at 16, in Fig. 2. The body portion 14 of the member 13 is provided with a boss or projecting portion 17 having an opening to receive the end 12 of the supporting rod 11, said member 13 being removable from said rod. At the lower portion of the boss 17 is a slot or recess portion 18 which is adapted to fit over a part of the horizontal portion of the supporting rod 11 so that while the holder member 13 is detachable, it is held by reason of the slot 18 against rotation so that if the holder contains two or more tooth brushes belonging to different persons which are of a similar kind, the position will not be changed and the tooth brushes will not thereby become mixed.

By making the holder member of glass or like material, the said holder will not rust or corrode, and being detachable, may be removed and readily cleaned.

A flange 19 may be arranged around the body 14 on the upper portion thereof within the openings 15 to form a socket 20 which is adapted to form a seat or holder retaining member for a tumbler, glass, or other receptacle, as at 21, in Fig. 2, though instead of a glass or tumbler, a bottle of tooth powder or receptacle holding paste or other dental objects may be properly supported by the device.

In Fig. 4 instead of the openings 15 extending through the body thereof, one or more substantially T-shaped openings 22 may be provided along the peripheral edge of the body 14. These openings 22 are enlarged at 23 with a similar opening 24 extending outward so that the brush handle with its narrow portion may be inserted through the opening 24 and then by a partial rotation held by the part 23 or the said handle may be inserted directly in the opening 23 if preferred.

Instead of the slot 18, any other suitable means may be provided to hold the member 13 against rotation.

From the foregoing, it will be evident that a simple and efficient device is provided which is thoroughly sanitary; that said device is inexpensive to manufacture and is attractive in appearance; and that said device is adapted to hold tooth brushes and other objects.

Having thus described my invention, I claim as new and desire to secure by Letters Patent:—

1. A device of the character described, comprising a base adapted to be attached to a support, a substantially L-shaped rod having one portion extending horizontally and secured to the base substantially centrally thereof and a shorter upright portion, a holder member of glass having a boss provided with an opening to fit over the short part of the rod and provided with a slot adapted to fit over the body of the rod to prevent rotation of said member, said holder member having a plurality of openings arranged around the same and adapted to support tooth brushes, and a flange forming a socket for an object arranged within the space occupied by the openings.

2. A device of the character described, comprising a base adapted to be attached to a support, a substantially L-shaped rod having one portion extending horizontally and secured to the base substantially centrally thereof, and a holder member having a boss provided with an opening to fit over the smaller part of the rod and provided with a slot adapted to fit over the body of the rod to prevent rotation of said member, said holder member having a plurality of openings arranged around the same and adapted to support tooth brushes.

3. A device of the character described, comprising a base adapted to be attached to a support, a substantially L-shaped rod having one portion extending horizontally and secured to the base substantially centrally thereof and a shorter upright portion, a holder member having a boss provided with an opening to fit over the smaller part of the rod and provided with a slot adapted to fit over the body of the rod to prevent rotation thereof, said holder member having a plurality of openings arranged around the same and adapted to support tooth brushes, and a flange forming a socket for an object arranged within the space occupied by the openings.

This specification signed and witnessed this 26th day of December, A. D. 1914.

CHARLES HAMMESFAHR.

Witnesses:
LESTER C. TAYLOR,
C. BARTELS.